US012025035B2

(12) United States Patent
Ozeki

(10) Patent No.: US 12,025,035 B2
(45) Date of Patent: Jul. 2, 2024

(54) VARIABLE VALVE DEVICE

(71) Applicant: SUZUKI MOTOR CORPORATION, Hamamatsu (JP)

(72) Inventor: Hisashi Ozeki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/460,380

(22) Filed: Sep. 1, 2023

(65) Prior Publication Data

US 2024/0077002 A1 Mar. 7, 2024

(30) Foreign Application Priority Data

Sep. 7, 2022 (JP) ................................ 2022-141935

(51) Int. Cl.

| | |
|---|---|
| ***F01L 1/18*** | (2006.01) |
| *F01L 1/02* | (2006.01) |
| *F01L 1/26* | (2006.01) |
| *F01L 13/00* | (2006.01) |
| *F02D 13/02* | (2006.01) |

(52) U.S. Cl.

CPC ............... *F01L 1/181* (2013.01); *F01L 1/022* (2013.01); *F01L 2001/186* (2013.01); *F01L 1/267* (2013.01); *F01L 13/0015* (2013.01); *F01L 13/0036* (2013.01); *F01L 2250/02* (2013.01); *F02D 13/0226* (2013.01)

(58) Field of Classification Search

CPC ..... F01L 1/022; F01L 1/181; F01L 2001/186; F01L 1/267; F01L 13/0015; F01L 13/0036; F01L 2250/02; F02D 13/0226

USPC ....................... 123/90.16, 90.31, 90.4, 90.44

See application file for complete search history.

(56) References Cited

FOREIGN PATENT DOCUMENTS

| | | | | | |
|---|---|---|---|---|---|
| BR | 102014030451 | A2 * | 3/2016 | ............. | F01L 1/267 |
| EP | 2784273 | A1 | 10/2014 | | |
| EP | 2853700 | A1 | 4/2015 | | |
| JP | 2009-091970 | A | 4/2009 | | |
| JP | 2014047623 | A * | 3/2014 | ............. | F01L 1/267 |
| JP | 5907552 | B2 | 4/2016 | | |
| WO | WO-2017065168 | A1 * | 4/2017 | ............. | F01L 1/181 |

OTHER PUBLICATIONS

Extended European Search Report issued to European Application No. 23194976.9 on Jan. 31, 2024.

* cited by examiner

*Primary Examiner* — Jorge L Leon, Jr.
(74) *Attorney, Agent, or Firm* — Stein IP, LLC

(57) ABSTRACT

A variable valve device can change valve operations of a cylinder head in which a cam chain is disposed at a center in a predetermined direction where cylinders are arranged and spark plugs are arranged by recessing outer walls on both sides in the direction in a concave shape. The device includes, for each cylinder, a rocker shaft extending along the direction, rocker arms supported by the rocker shaft, a connecting pin disposed in a pin hole of one of the rocker arms, a return pin disposed in a pin hole of the other of the rocker arms, a pressing member that causes the connecting pin to push the return pin, and a repulsive member that causes the return pin to push back the connecting pin, and the pins and the members are separated from the plug in a direction orthogonal to the direction in a plan view.

5 Claims, 6 Drawing Sheets

VARIABLE VALVE DEVICE

CROSS-REFERENCE TO RELATED APPLICATIONS

The disclosure of Japanese Patent Application No. 2022-141935 filed on Sep. 7, 2022, including specification, drawings and claims is incorporated herein by reference in its entirety.

TECHNICAL FIELD

The present invention relates to a variable valve device.

BACKGROUND ART

In related art, there is known a variable valve device in which a plurality of rocker arms are connected to each other to switch valve operations (see, for example, JP5907552B). In a variable valve device described in JP5907552B, a pair of rocker arms are arranged adjacent to each other, and a connecting pin is disposed in a pin hole of one rocker arm. By pushing a part of the connecting pin into a pin hole of the other rocker arm, the pair of rocker arms are connected and a pair of valves are simultaneously operated. By pulling out the part of the connecting pin from the pin hole of the other rocker arm, a connected state of the pair of rocker arms is released, and only one valve is operated.

SUMMARY

However, a spring pin for pushing back the connecting pin is disposed in the pin hole of the other rocker arm described in JP5907552B, resulting in an increase in a size. In a multi-cylinder engine in which a cam chain is disposed at a center in an arrangement direction of a plurality of cylinders and a spark plug is disposed outside in the arrangement direction of the cylinders, it is difficult to secure a large space between the cam chain and the spark plug. Therefore, when the rocker arm disclosed in JP5907552B is adopted, it is necessary to increase a size of an engine. In addition, when the spring pin is disposed in the rocker arm, the same rocker arm cannot be used for both cylinders with the cam chain interposed therebetween, and commonality of components cannot be achieved.

An object of the present disclosure is to provide a variable valve device capable of preventing an increase in a size of an engine and achieving commonality of components.

An aspect of a present embodiment which can solve the above technical problem is a variable valve device capable of changing valve operations of a cylinder head in which a cam chain is disposed at a center in a predetermined direction where a plurality of cylinders are arranged and spark plugs are arranged by recessing outer walls on both sides in the predetermined direction in a concave shape, the variable valve device including, for each cylinder, a rocker shaft extending along the predetermined direction in the cylinder head, a plurality of rocker arms swingably supported by the rocker shaft, a connecting pin disposed in a pin hole of a rocker arm closer to one side in the predetermined direction, a return pin disposed in a pin hole of a rocker arm closer to the other side in the predetermined direction, a pressing member configured to cause the connecting pin to push the return pin to the other side, and a repulsive member configured to cause the return pin to push back the connecting pin to one side. In the variable valve device, the connecting pin, the return pin, the pressing member, and the repulsive member are separated from the spark plug in a direction orthogonal to the predetermined direction in a plan view.

According to the variable valve device of the aspect of the present embodiment, when the return pin is pushed to the other side via the connecting pin by the pressing member, the connecting pin partially enters from the pin hole of the rocker arm closer to one side into the pin hole of the rocker arm closer to the other side, so that the plurality of rocker arms are connected. When the connecting pin is pushed back to the one side via the return pin by the repulsive member, the connecting pin is pulled out from the pin hole of the rocker arm closer to the other side, so that the connection of the plurality of rocker arms is released. By arranging the connecting pin, the return pin, the pressing member, and the repulsive member in a space separated from a concave recess of the cylinder head, a degree of freedom of a component layout can be improved, and an increase in a size of an engine can be prevented. Further, the same rocker arm can be used for the plurality of cylinders to achieve commonality of components.

DESCRIPTION OF EMBODIMENTS

A variable valve device according to one aspect of the present invention is provided in a cylinder head in which a cam chain is disposed at a center in a predetermined direction where a plurality of cylinders are arranged and spark plugs are arranged by recessing outer walls on both sides in the predetermined direction in a concave shape. In the cylinder head, the variable valve device changes valve operations. The variable valve device is provided with a rocker shaft, a plurality of rocker arms, a connecting pin, a return pin, a pressing member, and a repulsive member for each cylinder. The rocker shaft extends along the predetermined direction in the cylinder head, and the plurality of rocker arms are swingably supported by the rocker shaft. The connecting pin is disposed in a pin hole of a rocker arm closer to one side in the predetermined direction, and the return pin is disposed in a pin hole of a rocker arm closer to the other side in the predetermined direction. When the return pin is pushed to the other side via the connecting pin by the pressing member, the connecting pin partially enters from the pin hole of the rocker arm closer to one side into the pin hole of the rocker arm closer to the other side, so that the plurality of rocker arms are connected. When the connecting pin is pushed back to one side via the return pin by the repulsive member, the connecting pin is pulled out from the pin hole of the rocker arm closer to the other side, so that the connection of the plurality of rocker arms is released. Since the connecting pin, the return pin, the pressing member, and the repulsive member are separated from the spark plug in a direction orthogonal to the predetermined direction in a plan view, a degree of freedom of a component layout can be improved, and an increase in a size of an engine can be prevented. Further, the same rocker arm can be used for the plurality of cylinders to achieve commonality of components.

Embodiments

Figure 1:
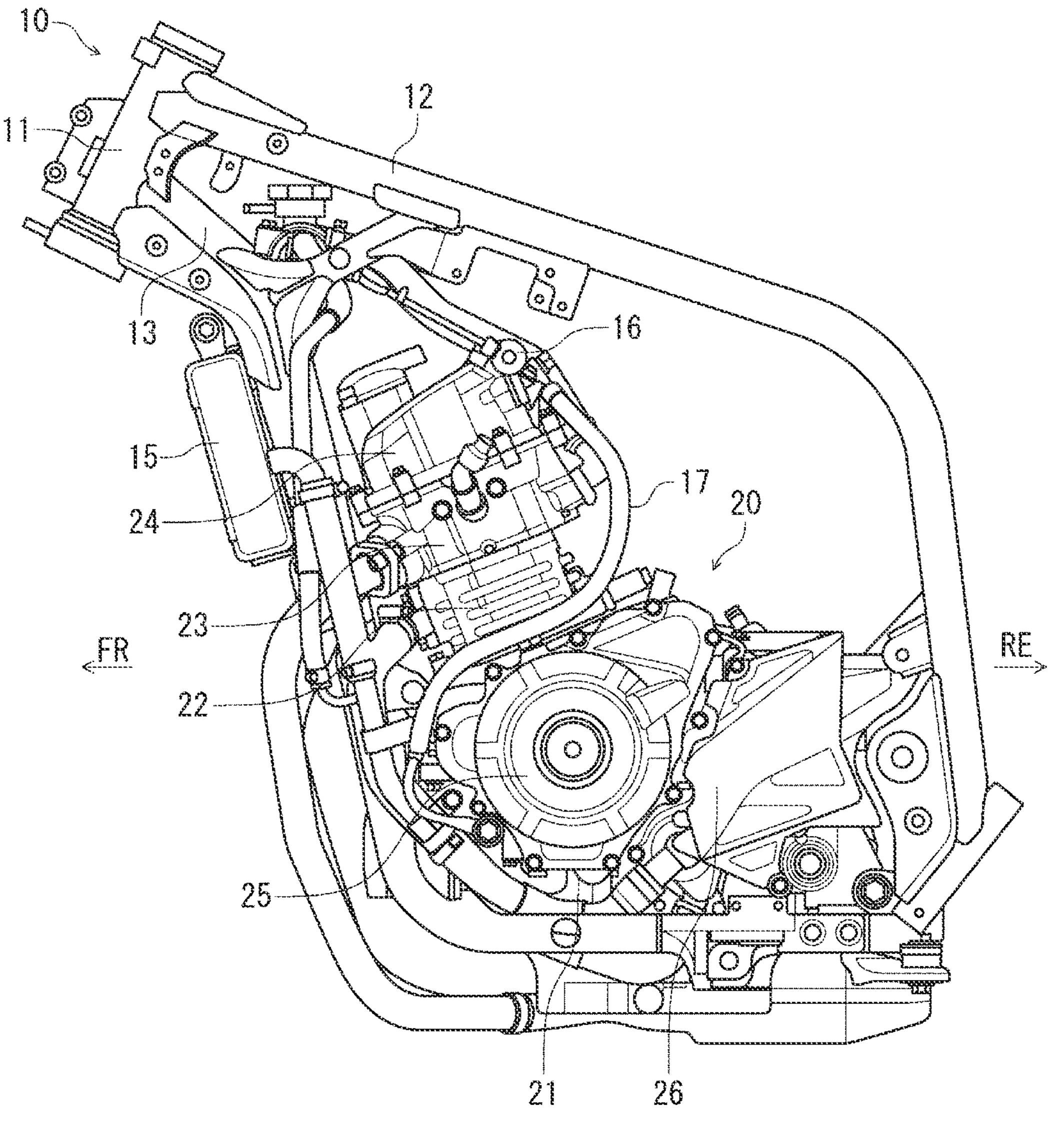
FIG. 1 is a left side view of an engine and a vehicle body frame according to an embodiment.
Figure 2:
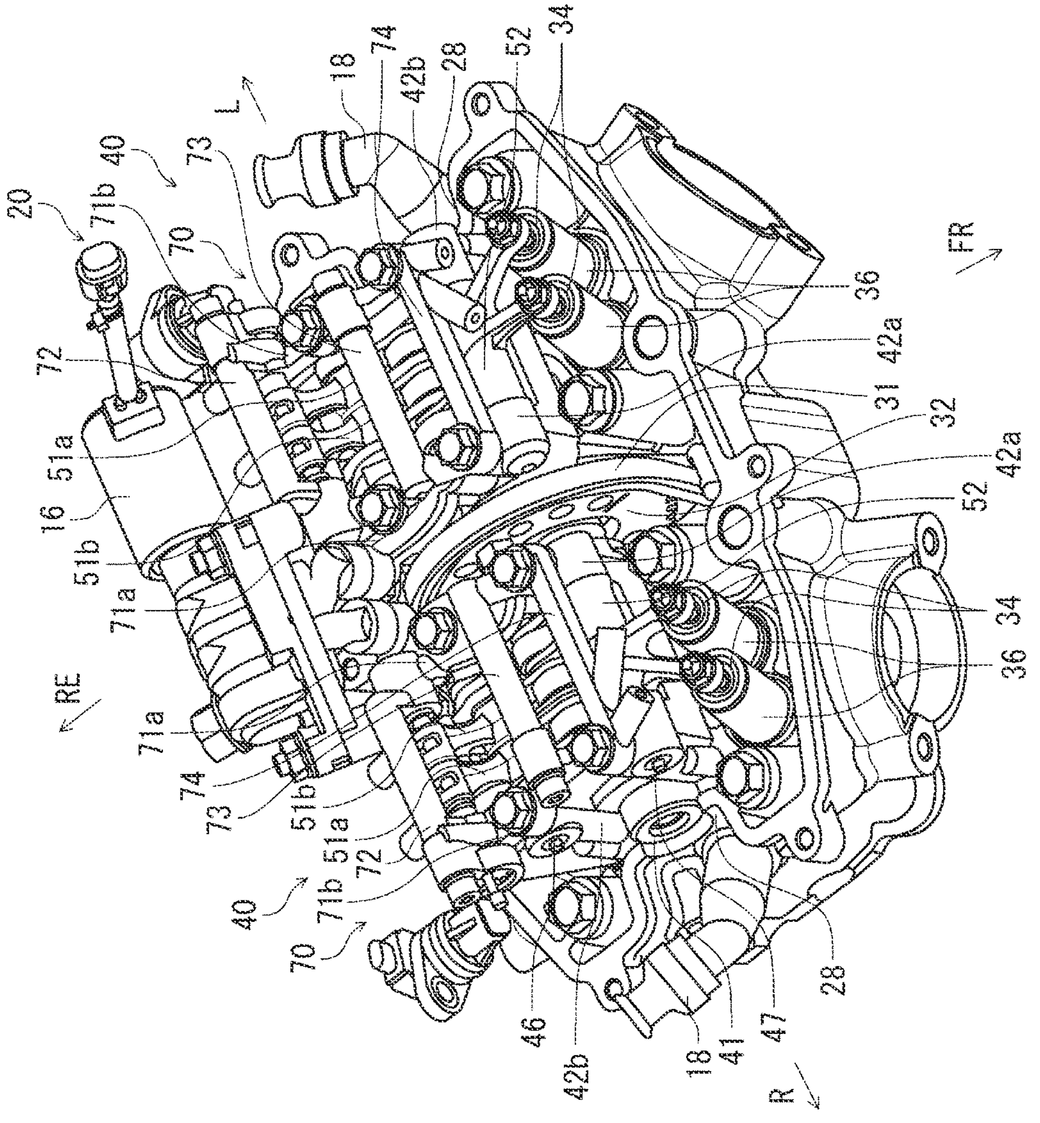
FIG. 2 is a perspective view of an inside of a cylinder head according to the present embodiment.
Figure 3:
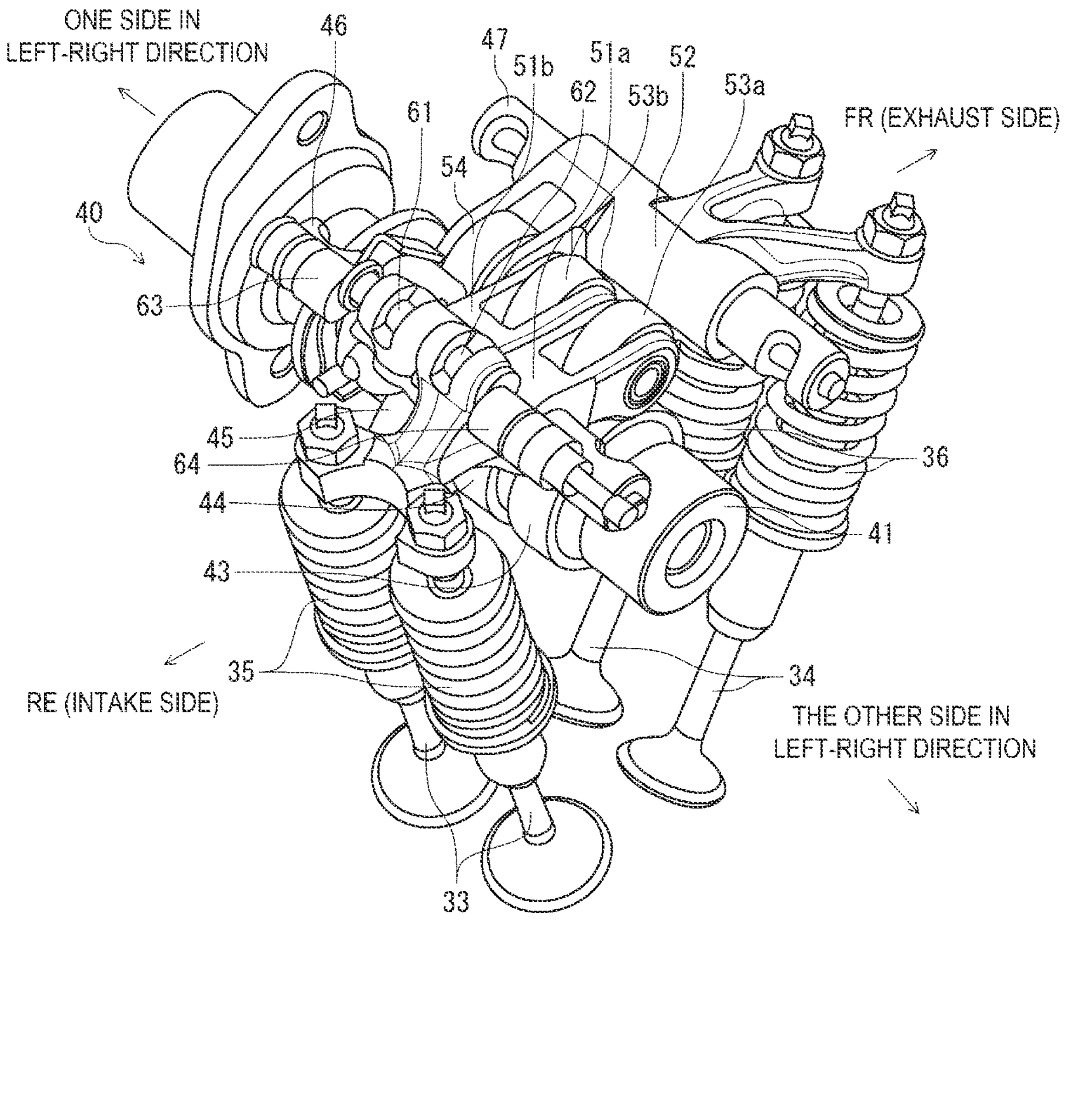
FIG. 3 is a perspective view of a variable valve device according to the present embodiment.

Hereinafter, an embodiment will be described in detail with reference to the accompanying drawings. FIG. 1 is a left side view of an engine and a vehicle body frame according to the present embodiment. FIG. 2 is a perspective view of an inside of a cylinder head according to the present embodiment. FIG. 3 is a perspective view of a variable valve device according to the present embodiment. In the following drawings, an arrow FR indicates a vehicle front side, an arrow RE indicates a vehicle rear side, an arrow L indicates a vehicle left side, and an arrow R indicates a vehicle right side. In addition, in the following description, a center side in a left-right direction of the cylinder head is referred to as one side, and an outer side in the left-right direction of the cylinder head is referred to as the other side.

As shown in FIG. 1, a straddle-type vehicle is formed by mounting various components such as an engine 20 and an electrical system on a cradle-type vehicle body frame 10. The vehicle body frame 10 includes a main tube 12 that extends rearward from an upper portion of a head pipe 11 and then bends downward, and a down tube 13 that extends downward from a lower portion of the head pipe 11 and then bends rearward. A rear end portion of the down tube 13 is joined to a lower end portion of the main tube 12 to form an installation space for the engine 20 inside the vehicle body frame 10. A rear side of the engine 20 is supported by the main tube 12, and a front side and a lower side of the engine 20 are supported by the down tube 13.

The engine 20 is a parallel two-cylinder engine, and includes a crankcase 21, a cylinder 22 provided on the crankcase 21, a cylinder head 23 provided on the cylinder 22, and a cylinder head cover 24 provided on the cylinder head 23. A magnet cover 25 that covers a magnet (not shown) from a lateral side is attached to a left side surface of the crankcase 21. A sprocket cover 26 that covers a drive sprocket (not shown) from a lateral side is attached to the rear of the magnet cover 25. A clutch cover (not shown) that covers a clutch (not shown) from a lateral side is attached to a right side surface of the crankcase 21.

A radiator 15 that radiates heat of cooling water of the engine 20 is disposed in front of the engine 20. An oil control valve 16 that controls a hydraulic pressure to variable valve devices 40 is disposed on an outer surface of the cylinder head cover 24. An oil is supplied to the oil control valve 16 from a main gallery of the crankcase 21 through an external pipe 17. A valve chamber is formed inside the cylinder head 23 and the cylinder head cover 24. The variable valve device 40 (see FIG. 3) that changes valve operations of intake valves 33 (see FIG. 3) and exhaust valves 34 (see FIG. 3) by the hydraulic pressure is mounted on the valve chamber.

Figure 4:
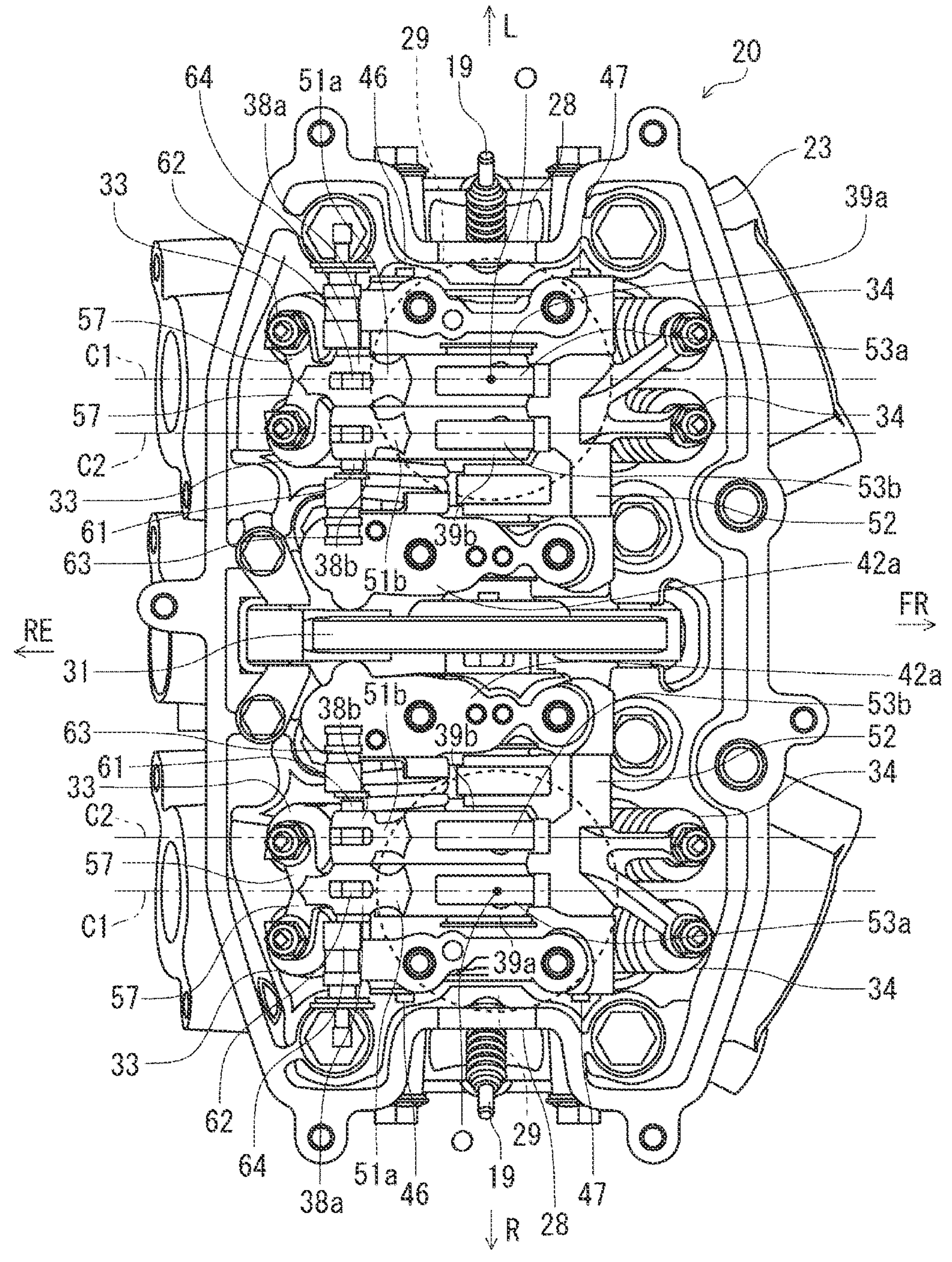
FIG. 4 is a top view of the inside of the cylinder head according to the present embodiment.

As shown in FIG. 2, the engine 20 is a four-valve two-cylinder engine, and a cam chain 31 is disposed between a pair of cylinders 29 (see FIG. 4). The cam chain 31 is wound around a cam sprocket 32, and the variable valve device 40 is disposed for each of the left and right cylinders 29 with the cam sprocket 32 interposed therebetween. The variable valve device 40 is provided with a camshaft 41 that rotates integrally with the cam sprocket 32. In the cylinder head 23, cam housings 42*a* and 42*b* are separated in a left-right direction (a predetermined direction) for each cylinder 29, and the camshaft 41 is rotatably supported by mating surfaces of the cam housings 42*a* and 42*b* and the cylinder head 23.

In the cylinder head 23, four intake valves 33 (see FIG. 3) are arranged behind the camshaft 41, and four exhaust valves 34 are arranged in front of the camshaft 41. The intake valve 33 is pressed in a valve-closing direction by a valve spring 35 (see FIG. 3), and the exhaust valve 34 is pressed in a valve-closing direction by a valve spring 36. A low-speed cam 43, a high-speed cam 44, and an exhaust cam 45 (all of which are shown in FIG. 3) are formed on an outer circumferential surface of the camshaft 41. Each of the cams 43 to 45 is formed in a plate-like shape with a cam ridge protruding from a part of a base circle. The cam ridge of the high-speed cam 44 is higher than that of the low-speed cam 43, so that a valve lift amount of the high-speed cam 44 is larger than that of the low-speed cam 43.

A rocker shaft 46 on an intake side and a rocker shaft 47 on an exhaust side are supported by opposing portions of the cam housings 42*a* and 42*b*. The rocker shaft 46 on the intake side and the rocker shaft 47 on the exhaust side are located above the camshaft 41, and the rocker shaft 46 on the intake side and the rocker shaft 47 on the exhaust side extend parallel to the camshaft 41. In addition, left and right side walls of the cylinder head 23 are recessed in a concave shape, and a pair of plug covers 18 are arranged in recesses 28 of the cylinder head 23. The oil control valve 16 that supplies the oil to the variable valve device 40 is disposed on a rear side of the cylinder head 23.

An upper housing 70 is supported at both ends by upper surfaces of the cam housings 42*a* and 42*b*. The upper housing 70 is formed in a ladder shape by housing fixing portions 71*a* and 71*b* extending in a front-rear direction and first to third bridge portions 72 to 74 extending in a left-right direction. The first bridge portion 72 extends along the rocker shaft 46 on the intake side, the second bridge portion 73 extends along the camshaft 41, and the third bridge portion 74 extends along the rocker shaft 47 on the exhaust side (see FIG. 3). A lubricating oil is supplied from the bridge portions 72 to 74 of the upper housing 70 to required locations of valve components.

As shown in FIGS. 2 and 3, two types of rocker arms 51*a* and 51*b* (only one of each is shown in FIG. 3) are swingably supported by the rocker shaft 46 on the intake side, and a rocker arm 52 (only one is shown in FIG. 3) is swingably supported by the rocker shaft 47 on the exhaust side. The rocker arm 51*a* on the intake side and the rocker arm 52 on the exhaust side are formed in a seesaw shape having a force point and an action point, and the rocker arm 51*b* on the intake side serves as a force point of the rocker arm 51*a*. Both a left end of the rocker arm 51*a* on the intake side and a right end of the rocker arm 52 on the exhaust side are bifurcated.

A roller 53*a* that is in rolling contact with the low-speed cam 43 is rotatably supported at one end of the rocker arm 51*a* on the intake side, and a pair of intake valves 33 are connected to the other end of the rocker arm 51*a* which is bifurcated. A roller 53*b* that is in rolling contact with the high-speed cam 44 is rotatably supported at one end of the rocker arm 51*b* on the intake side, and the intake valve 33 is not connected to the other end of the rocker arm 51*b*. A roller 54 that is in rolling contact with the exhaust cam 45 is rotatably supported at one end of the rocker arm 52 on the exhaust side, and a pair of exhaust valves 34 are connected to the other end of the rocker arm 52 which is bifurcated. The rocker arms 51*a* and 51*b* are formed in a connectable manner.

When the engine rotates at a low speed and a medium speed, the rocker arms 51*a* and 51*b* are not connected. Therefore, the rocker arm 51*a* is swung by the low-speed cam 43, and the rocker arm 51*b* is swung by the high-speed cam 44. Since the pair of intake valves 33 are connected to the rocker arm 51*a*, the pair of intake valves 33 are moved according to rotation of the low-speed cam 43. Since the cam ridge of the low-speed cam 43 is low, valve lift amounts of the pair of intake valves 33 are low. Since the intake valve 33 is not connected to the rocker arm 51*b*, the rocker arm 51*b* is idle according to rotation of the high-speed cam 44.

When the engine rotates at a high speed, the rocker arms 51*a* and 51*b* are connected. Therefore, the rocker arms 51*a* and 51*b* are swung integrally by the high-speed cam 44. Since the pair of intake valves 33 are connected to the rocker arm 51*b* via the rocker arm 51*a*, the pair of intake valves 33 are moved according to the rotation of the high-speed cam 44. Since the cam ridge of the high-speed cam 44 is high, the valve lift amounts of the pair of intake valves 33 are high. In this way, by switching a connected state of the rocker arms 51*a* and 51*b*, the low-speed cam 43 and the high-speed cam 44 for moving the intake valves 33 are switched.

Each of the variable valve devices 40 is provided with a switching mechanism that switches between the connected state and a non-connected state of the rocker arms 51*a* and 51*b* according to the hydraulic pressure. A connecting pin 61 is disposed in a pin hole of the rocker arm 51*b* closer to one side (closer to a center) in a left-right direction (a predetermined direction) of the cylinder head 23, and a return pin 62 is disposed in a pin hole of the rocker arm 51*a* closer to the other side (closer to an outer side) in the left-right direction of the cylinder head 23. A hydraulic piston (a pressing member) 63 is disposed on one side with respect to the rocker arm 51*b*, and a spring pin (a repulsive member) 64 with a spring is disposed on the other side with respect to the rocker arm 51*a*.

The hydraulic piston 63 causes the connecting pin 61 to push the return pin 62 to the other side, and the spring pin 64 causes the return pin 62 to push back the connecting pin 61 to one side. By pushing the connecting pin 61 by the hydraulic piston 63, a part of the connecting pin 61 enters the pin hole of the rocker arm 51*a* from the pin hole of the rocker arm 51*b*, so that the rocker arms 51*a* and 51*b* are connected. By pushing back the connecting pin 61 by the spring pin 64 via the return pin 62, the part of the connecting pin 61 is pulled out from the pin hole of the rocker arm 51*a*, so that the connection of the rocker arms 51*a* and 51*b* is released.

In the cylinder head 23, the cam chain 31 is disposed at a center in a left-right direction where the left and right cylinders 29 (see FIG. 4) are arranged, and spark plugs 19 (see FIG. 4) are arranged by recessing both outer walls in the left-right direction in a concave shape. In such a cylinder head 23, a space between the cam chain 31 and the spark plug 19 is narrowed, and the left and right cams of the camshaft 41 are brought closer to a center side (a cam chain 31 side) of the left and right cylinders 29. Therefore, each rocker arm for the left cylinder 29 and each rocker arm for the right cylinder 29 are normally formed in a horizontally inverted shape, and thus it is necessary to prepare a mold for each component, which increases a cost.

In particular, as a configuration in which a pair of rocker arms of each cylinder are connected via a connecting pin, a configuration in which a spring pin is disposed in a bottomed pin hole of one rocker arm is conceivable. However, in such rocker arms, pin holes are opened in left and right cylinders in opposite directions, and the rocker arms cannot be made in common in the left and right cylinders. Therefore, in the variable valve device 40 according to the present embodiment, shapes of the rocker arms 51*a* and 51*b* and a component layout are devised, so that commonality of the rocker arms 51*a* and 51*b* is achieved without increasing a size of the engine 20.

Figure 5:
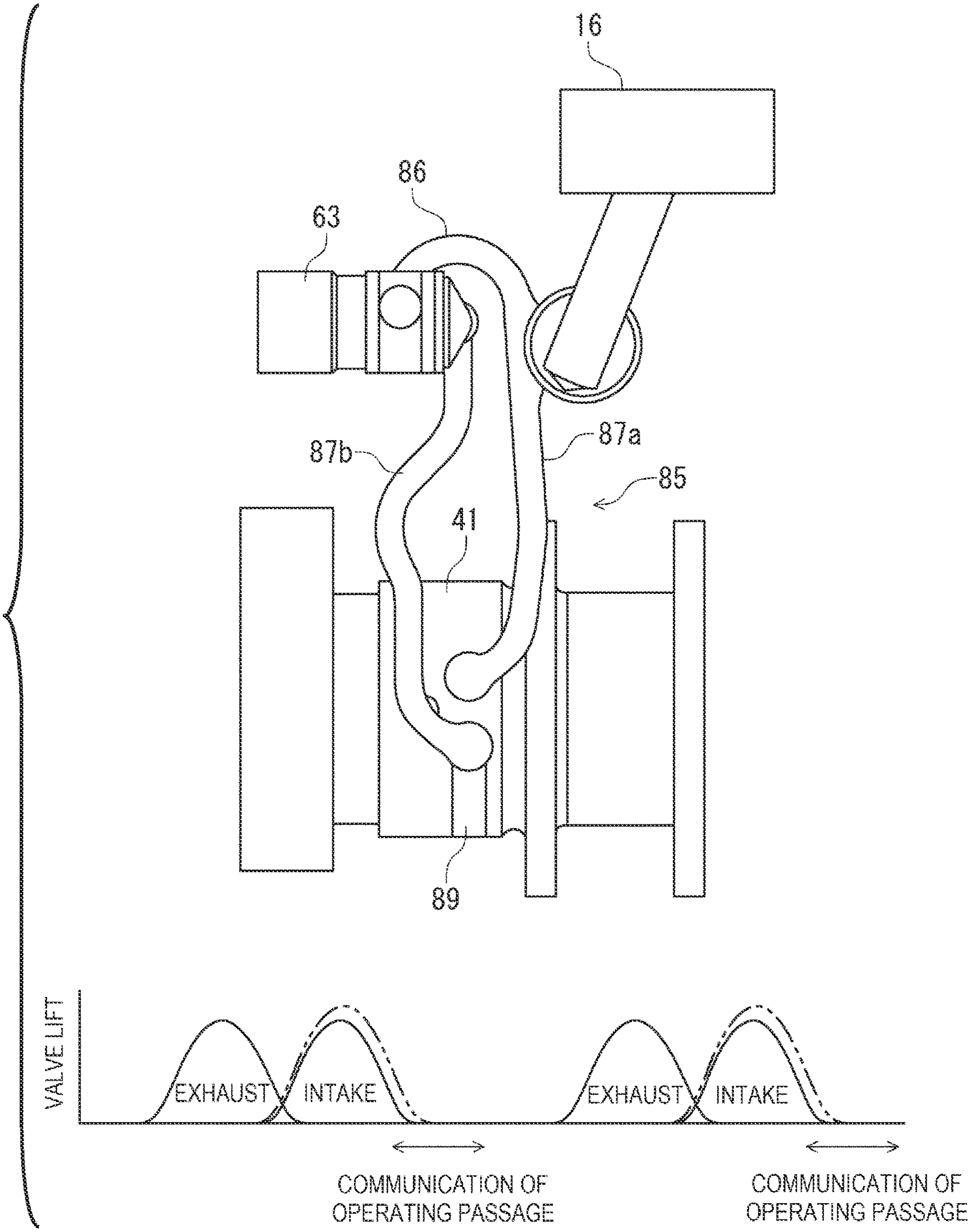
FIG. 5 is a schematic diagram of an operating passage and a short-cut passage according to the embodiment.

Hereinafter, a component layout and an oil passage of the variable valve device will be described with reference to FIGS. 4 and 5. FIG. 4 is a top view of the inside of the cylinder head according to the present embodiment. FIG. 5 is a schematic diagram of an operating passage and a short-cut passage according to the embodiment.

As shown in FIG. 4, in the cylinder head 23, the rocker shaft 46 on the intake side and the rocker shaft 47 on the exhaust side extend in a left-right direction (a predetermined direction). The rocker arms 51*a* and 51*b* are supported by the rocker shaft 46 on the intake side, and the rocker arm 52 is supported by the rocker shaft 47 on the exhaust side. The rocker arm 51*a* closer to the outer side in the left-right direction is a low-speed rocker arm on the intake side, and the rocker arm 51*b* closer to the center in the left-right direction is a high-speed rocker arm on the intake side. The rocker arms 51*a* and 51*b* are formed symmetrically with respect to center lines C1 and C2 extending in a longitudinal direction, respectively.

More specifically, the center line C1 of the rocker arm 51*a* passes through a cylinder center O, and the rocker arm 51*a* is formed symmetrically with respect to the center line C1. An action point side of the rocker arm 51*a* is branched into two parts, and a pair of branched portions 57 of the rocker arm 51*a* extend in the left-right direction. The pair of branched portions 57 have the same length, and the pair of intake valves 33 are connected to tip end sides of the pair of branched portions 57. The pair of intake valves 33 are located symmetrically with respect to the center line C1 passing through the cylinder center O. With such a layout, the pair of branched portions 57 are formed short, and the rocker arm 51*a* is disposed in the cylinder 29 in a compact manner.

The roller 53*a* is supported on a force point side of the rocker arm 51*a*, and the return pin 62 is supported near a fulcrum of the rocker arm 51*a*. A supporting portion (a supporting location) 38*a* of the return pin 62 and a supporting portion (a supporting location) 39*a* of the roller 53*a* are formed with substantially the same width, so that a width dimension of the rocker arm 51*a* is reduced. Shapes of the supporting portion 38*a* of the return pin 62 and the supporting portion 39*a* of the roller 53*a* are also formed symmetrically with respect to the center line C1. Since the entire rocker arm 51*a* has a symmetrical shape with respect to the center line C1, the same rocker arm 51*a* can be used in the left and right cylinders 29, thereby achieving commonality of components.

The center line C2 of the rocker arm 51*b* passes through a center side in a left-right direction with respect to the cylinder center O, and the rocker arm 51*b* is formed symmetrically with respect to the center line C2. There is no arm portion on an action point side of the rocker arm 51*b*, and the pair of intake valves 33 are not connected to the rocker arm 51*b*. The rocker arm 51*b* is located on the cam chain 31 side with respect to the rocker arm 51*a*, and the rocker arm 51*b* does not interfere with the concave recess 28 of the cylinder head 23. Since the rocker arm 51*b* is disposed by using a space on the cam chain 31 side without the recess 28, an increase in the size of the engine 20 is prevented.

The rocker arm 51*b* is adjacent to the rocker arm 51*a*, and a stem end of the intake valve 33 is located on the center line C2 of the rocker arm 51*b*. In this case, since there is no arm portion on the action point side of the rocker arm 51*b*, the rocker arm 51*b* does not interfere with the branched portion 57 extending from the action point side of the rocker arm 51*a* to the cam chain 31 side. The rocker arm 51*b* is positioned in front of the branched portion 57 of the rocker arm 51*a*, and the rocker arms 51*a* and 51*b* are arranged in the cylinder head 23 in a compact manner, so that the increase in the size of the engine 20 is prevented.

The roller 53*b* is supported on a force point side of the rocker arm 51*b*, and the connecting pin 61 is supported near a fulcrum of the rocker arm 51*b*. A supporting portion (a supporting location) 38*b* of the connecting pin 61 and a supporting portion (a supporting location) 39*b* of the roller 53*b* are formed with substantially the same width, so that a width dimension of the rocker arm 51*b* is reduced. Shapes of the supporting portion 38*b* of the connecting pin 61 and the supporting portion 39*b* of the roller 53*b* are also formed symmetrically with respect to the center line C2. Since the entire rocker arm 51*b* has a symmetrical shape with respect to the center line C2, the same rocker arm 51*b* can be used in the left and right cylinders 29, thereby achieving the commonality of the components.

The connecting pin 61, the return pin 62, the hydraulic piston 63, and the spring pin 64 are separated from the spark plug 19 in a front-rear direction (a direction orthogonal to a predetermined direction in a plan view). Even if the spring pin 64 is disposed outside the rocker arm 51*a* in the left-right direction, the spring pin 64 does not interfere with the concave recess 28 in which the spark plug 19 is disposed. Even if a large space cannot be secured between the cam chain 31 and the spark plug 19 due to the recess 28 of the cylinder head 23, the components such as the spring pin 64 are arranged using a space separated from the recess 28. Accordingly, a degree of freedom of the component layout can be improved, and the increase in the size of the engine 20 can be prevented.

On the rear side of the cylinder head 23, a pair of hydraulic pistons 63 are arranged symmetrically with the cam chain 31 interposed therebetween. The oil control valve 16 (see FIG. 2) that supplies an operating oil to the pair of hydraulic pistons 63 is disposed on a rear wall of the cylinder head 23. The oil control valve 16 is disposed at an equal distance from the pair of hydraulic pistons 63 and is located directly behind the cam chain 31. An oil passage for the operating oil extending from the oil control valve 16 to the pair of hydraulic pistons 63 is formed between the cam chain 31 and the pair of hydraulic pistons 63.

The housing fixing portion 71*a* of the upper housing 70 and the cam housing 42*a* (see FIG. 2) are located between the cam chain 31 and the hydraulic piston 63. An oil groove is formed in a lower surface of the housing fixing portion 71*a*, and an operating passage 85 (see FIG. 5) and a short-cut passage 86 (see FIG. 5) are formed as an oil passage by fixing the housing fixing portion 71*a* to the cam housing 42*a*. In this way, even in a layout in which the pair of hydraulic pistons 63 are arranged with the cam chain 31 interposed therebetween, the operating oil can be uniformly supplied to the pair of hydraulic pistons 63 through the operating passage 85 and the short-cut passage 86. By forming the oil passage in a narrow space, the increase in the size of the engine 20 can be prevented.

As shown in FIG. 5, in the housing fixing portion 71*a* (see FIG. 4), an upstream passage 87*a* of the operating passage 85 extends from the oil control valve 16 toward the camshaft 41, and a downstream passage 87*b* of the operating passage 85 extends from the camshaft 41 toward the hydraulic piston 63. A downstream end of the upstream passage 87*a* and an upstream end of the downstream passage 87*b* are positioned on the same circumference on the outer circumferential surface of the camshaft 41. An oil groove 89 is formed in a circumferential direction on a circumference of the outer circumferential surface of the camshaft 41. The oil groove 89 functions as an operating passage for supplying the operating oil to the hydraulic piston 63 together with the upstream passage 87*a* and the downstream passage 87*b*.

The oil is supplied from the oil control valve 16 to the hydraulic piston 63 only while the upstream passage 87*a* and the downstream passage 87*b* communicate with each other via the oil groove 89. At this time, the oil groove 89 is formed such that the upstream passage 87*a* and the downstream passage 87*b* communicate with each other at an end timing of valve lift, and the upstream passage 87*a* and the downstream passage 87*b* are separated before the start of the valve lift. That is, the oil groove 89 is formed such that the oil starts to be supplied from the oil control valve 16 to the hydraulic piston 63 at the end timing of the valve lift, and the supply of the oil to the hydraulic piston 63 ends before the start of the valve lift.

Since the oil starts to be supplied to the hydraulic piston 63 at the end timing of the valve lift, a connecting operation of the rocker arms 51*a* and 51*b* is not hindered by the valve lift. In addition, since the connecting operation of the rocker arms 51*a* and 51*b* ends before the valve lift starts, the rocker arms 51*a* and 51*b* are not connected during the valve lift. Accordingly, as the camshaft 41 rotates, the oil is intermittently supplied from the oil control valve 16 to the hydraulic piston 63 through the operating passage 85, and the rocker arms 51*a* and 51*b* can be smoothly connected via the connecting pin 61.

The short-cut passage 86 extends directly from the oil control valve 16 to the hydraulic piston 63. The short-cut passage 86 is formed shorter than the operating passage 85. A stepwise oil supply structure with respect to the hydraulic piston 63 is formed such that the oil is supplied from the short-cut passage 86 to the hydraulic piston 63 after the oil is supplied from the operating passage 85 to the hydraulic piston 63. Although the intermittent supply of the oil from the operating passage 85 alone may cause the hydraulic piston 63 to move, the hydraulic piston 63 is stably maintained by directly supplying the oil from the short-cut passage 86.

Figure 6A:
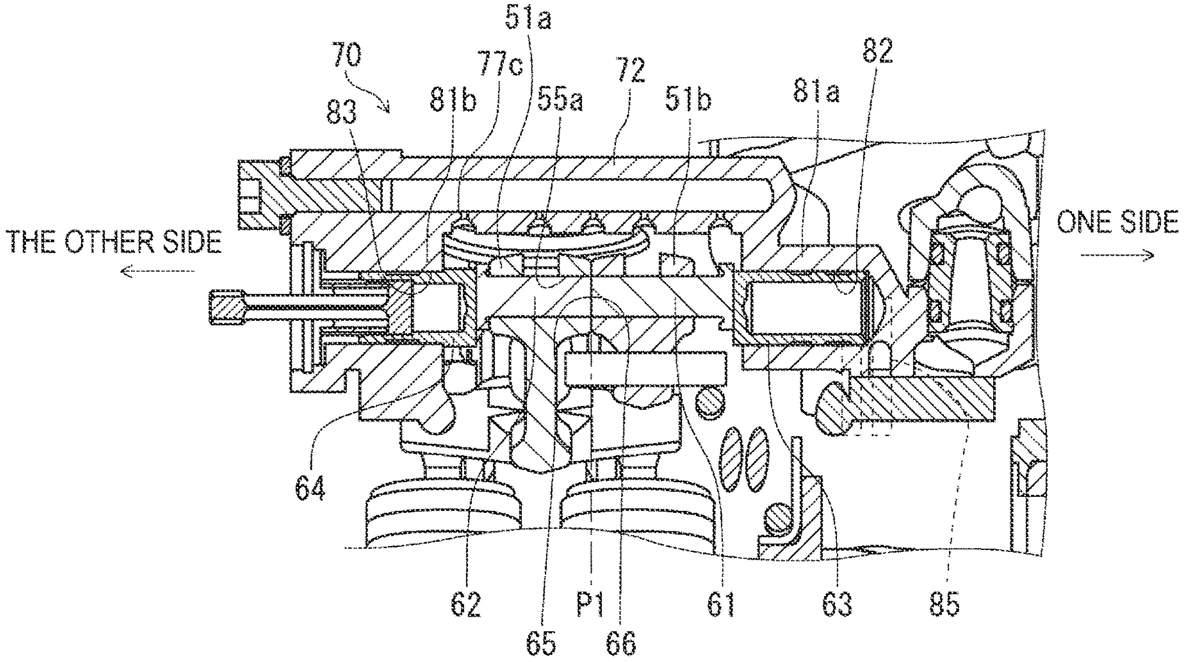
FIGS. 6A and 6B show explanatory views of a connecting operation of the variable valve device according to the present embodiment.
Figure 6B:
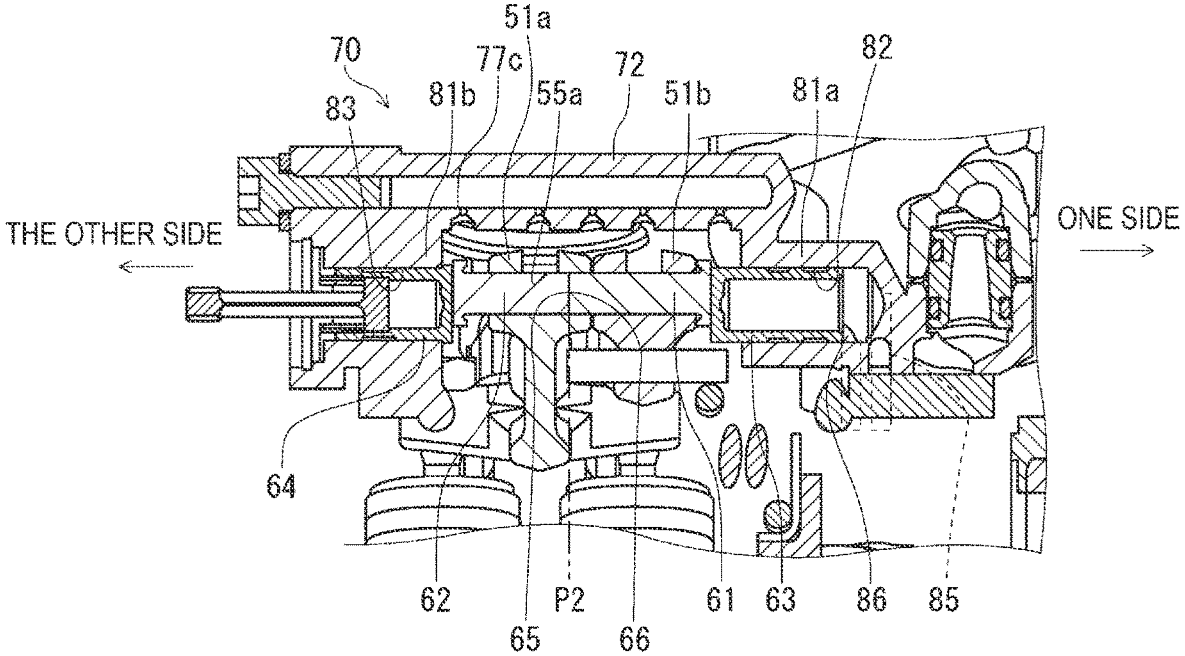

A connecting operation of the variable valve device will be described with reference to FIGS. 6A and 6B. FIGS. 6A and 6B show explanatory views of the connecting operation of the variable valve device according to the present embodiment. In FIGS. 6A and 6B, for convenience of description, reference signs in FIG. 5 are used as appropriate.

As shown in FIG. 6A, in the upper housing 70, the hydraulic chamber 82 is formed in the connecting portion 81*a* on one side with respect to the rocker arm 51*b*, and the accommodation hole 83 is formed in the connecting portion 81*b* on the other side with respect to the rocker arm 51*a*. The hydraulic piston 63 is disposed in the hydraulic chamber 82, and the spring pin 64 is disposed in the accommodation hole 83. The hydraulic piston 63 is in contact with the connecting pin 61 in the rocker arm 51*b*, and the spring pin 64 is in contact with the return pin 62 in the rocker arm 51*a*. Center lines of the hydraulic piston 63 and the spring pin 64 coincide with each other, and wear due to partial contact between the components is prevented.

When the engine rotates at a low speed, the oil is not supplied from the oil control valve 16 to the hydraulic chamber 82. No pressing force is applied from the hydraulic piston 63 to the connecting pin 61, and a spring force of the spring pin 64 is applied to the return pin 62. The return pin 62 abuts against the rocker arm 51*a*, and the return pin 62 is positioned at an initial position. At this time, the other end 65 of the connecting pin 61 is in contact with one end 66 of the return pin 62 at a non-connecting position P1 in a gap between the rocker arms 51*a* and 51*b*. The other end 65 of the connecting pin 61 is located outside the rocker arm 51*b*, and the rocker arms 51*a* and 51*b* are disconnected from each other.

As shown in FIG. 6B, when an engine speed is increased to a predetermined speed or more, the oil starts to be supplied from the oil control valve 16 to the hydraulic chamber 82. As the camshaft 41 rotates, the upstream passage 87*a* and the downstream passage 87*b* of the operating passage 85 intermittently communicate with each other through the oil groove 89, and the oil is intermittently supplied from the operating passage 85 to the hydraulic piston 63. At this time, the oil starts to be supplied at the end timing of the valve lift of the intake valve 33 so as not to hinder the connecting operation of the rocker arms 51*a* and 51*b*. Therefore, the hydraulic piston 63 is smoothly pushed out in an advancing direction with the oil from the operating passage 85.

The connecting pin 61 is pushed in by the hydraulic piston 63, and the spring pin 64 is moved to the other side via the return pin 62 by the connecting pin 61. The other end 65 of the connecting pin 61 is moved to the other side from the non-connecting position P1 to a connecting position P2 in the rocker arm 51*a*. When a part of the connecting pin 61 enters a pin hole 55*a* of the rocker arm 51*a*, the rocker arms 51*a* and 51*b* are connected via the connecting pin 61. A downstream end of the short-cut passage 86 is opened by the movement of the hydraulic piston 63, and a position of the hydraulic piston 63 is maintained by continuous oil supply from the short-cut passage 86.

As shown in FIG. 6A, when the engine speed falls below the predetermined speed, the oil is returned from the hydraulic piston 63 to the oil control valve 16. The pushing of the connecting pin 61 by the hydraulic piston 63 is released, the return pin 62 is pushed back by a repulsive force of the spring pin 64, and the connecting pin 61 is pushed back to the one side by the return pin 62. The other end 65 of the connecting pin 61 is moved to the one side from the connecting position P2 to the non-connecting position P1. When the part of the connecting pin 61 is pulled out from the pin hole 55*a* of the rocker arm 51*a*, the connection of the rocker arms 51*a* and 51*b* is released.

As described above, according to the variable valve device 40 of the present embodiment, when the return pin 62 is pushed to the other side via the connecting pin 61 by the hydraulic piston 63, the connecting pin 61 partially enters the pin hole of the rocker arm 51*a* from the pin hole of the rocker arm 51*b*, so that the rocker arms 51*a* and 51*b* are connected. When the connecting pin 61 is pushed back to the one side via the return pin 62 by the spring pin 64, the connecting pin 61 is pulled out from the pin hole of the rocker arm 51*a*, so that the connection of the rocker arms 51*a* and 51*b* is released. By arranging the connecting pin 61, the return pin 62, the hydraulic piston 63, and the spring pin 64 in the space separated from the concave recess 28 of the cylinder head 23, the degree of freedom of the component layout can be improved, and the increase in the size of the engine 20 can be prevented. Further, the same rocker arms 51*a* and 51*b* can be used for the left and right cylinders 29 to achieve the commonality of the components.

In the present embodiment, the pair of rocker arms are provided on the intake side of the variable valve device, but a plurality of rocker arms may be provided on the intake side of the variable valve device. For example, three or more rocker arms may be provided on the intake side of the variable valve device.

In the present embodiment, the hydraulic piston is shown as an example of the pressing member, but the pressing member may be a member that causes the connecting pin to push the return pin to the other side.

In the present embodiment, the spring pin is shown as an example of the repulsive member, but the repulsive member may be a member that causes the return pin to push back the connecting pin to the one side.

In the present embodiment, the pair of cylinders are formed in the engine, but three or more cylinders may be formed in the engine.

In the present embodiment, a flange pin is used for the connecting pin and the return pin, but a straight pin may be used for the connecting pin and the return pin.

In the present embodiment, the seesaw-type rocker arm is shown as an example, but a type of the rocker arm is not particularly limited, and the rocker arm may be of a finger follower type.

In the present embodiment, the plurality of rocker arms are adjacent to each other, but the plurality of rocker arms may be separated from each other.

In the present embodiment, the operating passage and the short-cut passage are formed in the upper housing, but an oil passage capable of supplying the operating oil to the hydraulic piston may be formed in the cylinder head.

An exhaust device according to the present embodiment is not limited to the engine of the straddle-type vehicle described above, and may be adopted for an engine of another vehicle. The straddle-type vehicle is not limited to a motorcycle, and may be any vehicle on which an engine is mounted. The straddle-type vehicle is not limited to general vehicles on which a driver rides in a posture of straddling a seat, and includes a scooter-type vehicle on which the driver rides without straddling the seat.

As described above, a first aspect relates to a variable valve device (40) capable of changing valve operations of a cylinder head (23) in which a cam chain (31) is disposed at a center in a predetermined direction where a plurality of cylinders (29) are arranged and spark plugs (19) are arranged by recessing outer walls on both sides in the predetermined direction in a concave shape, the variable valve device (40) including: for each cylinder, a rocker shaft (46) extending along the predetermined direction in the cylinder head; a plurality of rocker arms (51*a*, 51*b*) swingably supported by the rocker shaft; a connecting pin (61) disposed in a pin hole of a rocker arm closer to one side in the predetermined direction; a return pin (62) disposed in a pin hole of a rocker arm closer to the other side in the predetermined direction; a pressing member (the hydraulic piston 63) configured to cause the connecting pin to push the return pin to the other side; and a repulsive member (the spring pin 64) configured to cause the return pin to push back the connecting pin to one side, in which the connecting pin, the return pin, the pressing member, and the repulsive member are separated from the spark plug in a direction orthogonal to the predetermined direction in a plan view.

According to this configuration, when the return pin is pushed to the other side via the connecting pin by the pressing member, the connecting pin partially enters from the pin hole of the rocker arm closer to one side into the pin hole of the rocker arm closer to the other side, so that the plurality of rocker arms are connected. When the connecting pin is pushed back to the one side via the return pin by the repulsive member, the connecting pin is pulled out from the pin hole of the rocker arm closer to the other side, so that the connection of the plurality of rocker arms is released. By arranging the connecting pin, the return pin, the pressing member, and the repulsive member in a space separated from a concave recess of the cylinder head, a degree of freedom of a component layout can be improved, and an increase in a size of an engine can be prevented. Further, the same rocker arm can be used for the plurality of cylinders to achieve commonality of components.

In a second aspect according to the first aspect, the rocker arm (51*b*) closer to one side is a high-speed rocker arm, and the rocker arm (51*a*) closer to the other side is a low-speed rocker arm. An action point side of the low-speed rocker arm is branched into two parts to connect with a pair of intake valves (33). A center line (C1) extending in a longitudinal direction of the low-speed rocker arm passes through a cylinder center (O), and a pair of branched portions (57) of the low-speed rocker arm are formed symmetrically with respect to the center line. According to this configuration, the pair of intake valves are located symmetrically with respect to the center line of the low-speed rocker arm passing through the cylinder center. Accordingly, the pair of branched portions are formed short, and the rocker arm is disposed in the cylinder in a compact manner.

In a third aspect according to the second aspect, the high-speed rocker arm is located on a cam chain side with respect to the low-speed rocker arm. According to this configuration, the increase in the size of the engine can be prevented by disposing the high-speed rocker arm on the cam chain side having no recess.

In a fourth aspect according to the second aspect or the third aspect, a stem end of the intake valve is located on a center line (C2) extending in a longitudinal direction of the high-speed rocker arm. According to this configuration, the increase in the size of the engine can be prevented by arranging the low-speed rocker arm and the high-speed rocker arm in a compact manner.

In a fifth aspect according to any one of the first aspect to the fourth aspect, the plurality of rocker arms are formed symmetrically with respect to a center line extending in a longitudinal direction of the plurality of rocker arms. A roller (53*b*) is supported on a force point side of the rocker arm closer to one side, and a supporting location (the supporting portion 58*b*) of the roller and a supporting location (the supporting portion 59*b*) of the connecting pin have substantially the same width. A roller (53*a*) is supported on a force point side of the rocker arm closer to the other side, and a supporting location (the supporting portion 58*a*) of the roller and a supporting location (the supporting portion 58*b*) of the return pin have substantially the same width. According to this configuration, a width dimension of the plurality of rocker arms is reduced. The same rocker arm can be used for the plurality of cylinders to achieve the commonality of the components.

In a sixth aspect according to any one of the first aspect to the fifth aspect, the plurality of cylinders includes a pair of cylinders, and the pressing member includes a pair of hydraulic pistons configured to be operated with a hydraulic pressure. The pair of hydraulic pistons are arranged symmetrically with the cam chain interposed therebetween. An oil control valve configured to supply an operating oil to the pair of hydraulic pistons is disposed at a position at an equal distance from the pair of hydraulic pistons, and an oil passage (the operating passage 85 and the short-cut passage 86) extending from the oil control valve to the pair of hydraulic pistons is formed between the cam chain and the pair of hydraulic pistons. According to this configuration, even in a layout in which the pair of hydraulic pistons are arranged with the cam chain interposed therebetween, the operating oil can be uniformly supplied to the pair of hydraulic pistons. By forming the oil passage in a narrow space, the increase in the size of the engine can be prevented.

Although the present embodiment has been described, the above-described embodiment and modification may be combined entirely or partially as another embodiment.

The technique of the present invention is not limited to the above-described embodiment, and various changes, substitutions, and modifications may be made without departing from the spirit of the technical idea of the present invention. The present invention may be implemented using other methods as long as the technical idea can be implemented by the methods through advance of the technique or other derivative techniques. Accordingly, the claims cover all embodiments that may be included within the scope of the technical idea.

What is claimed is:

1. A variable valve device for changing valve operations within a cylinder head of an engine, the cylinder head including a cam chain which bisects the cylinder head between a pair of cylinders, and a pair of opposing outer end walls each defining a concave recess receiving a respective spark plug, for each cylinder the variable valve device comprising:
- a rocker shaft extending along a longitudinal direction of the cylinder head between the cam chain and the respective spark plug;
- a plurality of rocker arms pivotally supported on the rocker shaft, the plurality of rocker arms including a first rocker arm and a second rocker arm;
- a connecting pin disposed in a first pin hole of the first rocker arm;
- a return pin disposed in a second pin hole of the second rocker arm;
- a hydraulic piston configured to cause the connecting pin to push the return pin away from the first rocker arm via hydraulic pressure; and
- a repulsive member configured to cause the return pin to push the connecting pin back toward the first rocker arm, wherein:
  - for each cylinder, the connecting pin, the return pin, the hydraulic piston, and the repulsive member are laterally offset from the respective spark plug in a direction perpendicular to the rocker shaft when seen from a top view of the cylinder head,
  - the hydraulic pistons of the pair of cylinders are arranged symmetrically with respect to the cam chain,
  - the hydraulic pistons of the pair of cylinders are further configured to receive an operating oil from an oil control valve disposed at a position equidistant to the hydraulic pistons, and
  - for each cylinder, an oil passage extending from the oil control valve to the hydraulic piston is formed between the cam chain and the hydraulic piston.

2. The variable valve device according to claim 1, wherein, for each cylinder:

the first rocker arm is a high-speed rocker arm, and the second rocker arm is a low-speed rocker arm, a valve side of the low-speed rocker arm includes a pair of branched portions configured to respectively engage a pair of intake valves, a longitudinal center line of the low-speed rocker arm passes through a center of the cylinder, and the pair of branched portions are formed symmetrically with respect to the center line.

3. The variable valve device according to claim 2, wherein, for each cylinder:

the high-speed rocker arm is located between the cam chain and the low-speed rocker arm.

4. The variable valve device according to claim 2, wherein, for each cylinder:

a stem end of a first intake valve of the pair of intake valves is located on a longitudinal center line of the high-speed rocker arm.

5. The variable valve device according to claim 1, wherein, for each cylinder:

the plurality of rocker arms is formed symmetrically with respect to a center line extending in a longitudinal direction of the plurality of rocker arms, a first roller is supported on a cam side of the first rocker arm, and a width of a supporting location of the first roller is equal to a width of a supporting location of the connecting pin, and a second roller is supported on a cam side of the second rocker arm, and a width of a supporting location of the second roller is equal to a width of a supporting location of the return pin.

* * * * *